United States Patent
Berntsen et al.

(10) Patent No.: US 9,032,976 B2
(45) Date of Patent: May 19, 2015

(54) WASHER/DRYER FOR CONVEYOR BELT (75) Inventors: Roy Berntsen, Valley Stream, NY (US); Niv Eldor, South Setauket, NY (US)

(73) Assignee: Tarpaulin.com, Inc., Woodbury, NY (US)

( * ) Notice: Subject to any disclaimer, the term of this patent is extended or adjusted under 35 U.S.C. 154(b) by 856 days.

(21) Appl. No.: 13/221,431

(22) Filed: Aug. 30, 2011

(65) Prior Publication Data
US 2012/0067382 A1 Mar. 22, 2012

Related U.S. Application Data (60) Provisional application No. 61/378,147, filed on Aug. 30, 2010.

(51) Int. Cl.
 A47L 15/24 (2006.01)
 B08B 3/02 (2006.01)
 B08B 3/04 (2006.01)
 B65G 45/22 (2006.01)

(52) U.S. Cl.
 CPC ............. B65G 45/22 (2013.01); A47L 15/248 (2013.01); B08B 3/022 (2013.01); B08B 3/041 (2013.01); A47L 15/247 (2013.01)

(58) Field of Classification Search
 CPC ..... A47L 15/247; A47L 15/248; B08B 3/022; B08B 3/041; B65G 45/22
 See application file for complete search history.

(56) References Cited

U.S. PATENT DOCUMENTS

| | | | |
|---|---|---|---|
| 2,266,309 A | 12/1941 | Cohen | |
| 2,660,293 A | 11/1953 | Merritt | |
| 2,881,463 A | 4/1959 | Vogel | |
| 3,017,986 A | 1/1962 | Ackles | |
| 3,762,858 A | 10/1973 | Torrence | |
| 3,815,728 A | 6/1974 | Vaughan | |
| 3,844,133 A | 10/1974 | Bierley et al. | |
| 3,872,681 A | 3/1975 | Bierley et al. | |
| 3,886,959 A | 6/1975 | Stott | |
| 3,998,321 A | 12/1976 | Schultz | |
| 4,051,211 A | 9/1977 | Beser et al. | |
| 4,196,693 A | 4/1980 | Unversaw | |
| 4,226,325 A | 10/1980 | Vandas | |
| 4,709,713 A | 12/1987 | Kuhl | |
| 4,777,972 A | 10/1988 | Adam | |
| 4,860,883 A | 8/1989 | Knaul et al. | |
| 4,955,209 A | 9/1990 | Smith | |
| 4,960,200 A | 10/1990 | Pierce | |
| 5,117,967 A | 6/1992 | Morrow et al. | |
| 5,307,993 A | 5/1994 | Simonetti et al. | |
| 5,333,724 A | 8/1994 | Wingfield et al. | |
| 5,355,992 A | 10/1994 | Baig et al. | |
| 5,368,650 A | 11/1994 | Tanaka et al. | |

(Continued)

*Primary Examiner* — Joseph L Perrin
*Assistant Examiner* — Levon J Shahinian
(74) *Attorney, Agent, or Firm* — Hoffmann & Baron, LLP (57) ABSTRACT

A conveyor belt washer/dryer that includes a housing, which encloses a washing station separated by one or more spray barriers from a drying station. The housing has a passage that is sized and configured to allow the conveyor belt to successively pass through the washing station and the drying station. The washing station includes one or more washing heads, a splash plate and a reservoir. The washing heads discharge a wash liquid onto the top surface of the conveyor belt and the splash plate redirects the wash liquid onto the bottom surface. The reservoir collects the spent wash liquid. The drying station includes one or more air knife/knives that discharge(s) pressurized air onto the conveyor belt to dry the belt.

26 Claims, 4 Drawing Sheets

(56) References Cited

U.S. PATENT DOCUMENTS

| | | |
|---|---|---|
| 5,372,243 A | 12/1994 | King |
| 5,598,915 A | 2/1997 | Malmberg et al. |
| 5,649,616 A | 7/1997 | Stecklow |
| 5,706,932 A | 1/1998 | White |
| 5,783,044 A | 7/1998 | Schneider et al. |
| 6,051,076 A | 4/2000 | Oechsle et al. |
| 6,196,374 B1 | 3/2001 | Kilgert et al. |
| 6,254,730 B1 | 7/2001 | Macierewicz |
| 6,260,231 B1 * | 7/2001 | Bybee et al. ............ 15/309.2 |
| 6,360,874 B1 | 3/2002 | Virippil et al. |
| 6,364,959 B1 | 4/2002 | Straub et al. |
| 6,401,910 B1 | 6/2002 | Pellini |
| 6,478,141 B2 | 11/2002 | Virippil et al. |
| 6,971,503 B2 | 12/2005 | Thompson |
| 7,044,287 B1 | 5/2006 | Gray |
| 7,083,039 B2 | 8/2006 | Schloesser |
| 7,419,046 B2 | 9/2008 | Cezary |
| 2007/0023069 A1 * | 2/2007 | Berner et al. ............ 134/25.2 |
| 2009/0178695 A1 * | 7/2009 | Becker et al. ............ 134/72 |

\* cited by examiner

WASHER/DRYER FOR CONVEYOR BELT

This application claims priority from provisional application Ser. No. 61/378,147, filed on Aug. 30, 2010, which is incorporated herein in its entirety.

BACKGROUND OF THE INVENTION

The present invention relates to a washer/dryer for a conveyor belt and, more particularly, to a combination washing/drying apparatus for cleaning a conveyor belt within an enclosed space.

Conveyor belts are used in many industrial applications, including applications involving preparation of food products. It will be appreciated that a conveyor belt accumulates dirt and other deposits over time and through usage. Although cleanliness is desirable in many applications, it is particularly desirable, and often required, in food preparation applications. In addition to normal dirt and dust that may accumulate on a conveyor belt in a plant, use of a conveyor belt in a food application process often times exposes the belt to spillage and overflow of food products. Over time, these food products can become embedded in and/or baked onto the belt, particularly when the belt passes through a high temperature oven.

It will, therefore, be appreciated by those skilled in the art that cleaning of conveyor belts in food application processes is a necessary and ongoing requirement. Often times, the wash tank is permanently installed as part of the conveyor belt setup whereby a point on a conveyor belt will pass through the wash tank each time it completely traverses the entire track of the setup.

One preferred washer design is disclosed in U.S. Pat. No. 7,044,287, the disclosure of which is incorporated herein by reference. As discussed in the '287 patent, the disclosed design provides increase cleaning performance, adaptability to various sized conveyor belts including belts having substantial widths, improved serviceability, and improved containment of pressurized fluid within the wash tank.

Although the '287 patent provides an improved design for washing conveyor belts, the '287 apparatus, as well as the prior art, are lacking with respect to conveyor belt dryers. More particularly, the prior art dryers suffer from two main disadvantages: (1) the inability to fully dry the conveyor belt, and/or (2) the inability to contain/collect the fluid that has been removed from the belt. Moreover, the prior art has failed to adequately combine the washing and drying functions into a single, integrated unit. In this regard, the prior art has often required separate washing and drying apparatuses, which generally occupy additional floor space and extend along a substantial portion of the belt pathway. These limitations also make it more difficult to install the prior art washers and dryers on existing conveyor belts.

There is, therefore, a need in the art for an improved conveyor belt washer/dryer that preferably combines the separate washing and drying functions into an integrated unit, which is capable of both washing and drying the belt within an enclosed space, and which reduces/eliminates excess spray and/or discharge of fluid into the surrounding environment.

SUMMARY OF THE INVENTION

In accordance with the present invention, a washer/dryer for a conveyor belt is provided. The conveyor belt washer/dryer includes a housing, a washing station, a drying station and one or more spray barriers. The housing defines a substantially enclosed interior and an exterior and includes first and second ends, opposing sides, a top wall, a bottom wall and a substantially horizontal passage. The passage has a first and second ends that correspond to and extend between the first and second ends of the housing. The passage is sized and configured to allow the conveyor belt to movably pass through the housing. The top and/or bottom walls of the housing can have at least one removable panel for accessing the interior. Preferably, the top wall above the drying station slopes downwardly towards the second end of the housing. The housing can also include an opening and a removable plug in one of the opposing side walls for accessing the washing station and a spray bar. The removable plug is removed to allow insertion of the spray bar into the interior of the housing.

The washing station is located in the interior of the housing and it is in communication with the exterior via the first end of the passage. The washing station includes one or more washing heads, a splash plate and a reservoir. The one or more washing heads are preferably rotatable and discharge a wash liquid into the passage in a first direction. Preferably, the splash plate is located below the passage and redirects the wash liquid in a second direction. The reservoir is located at the bottom of the housing and collects the spent wash liquid.

The drying station is located in the interior of the housing and it is in communication with the washing station via the passage and it is in communication with the exterior via the second end of the passage. The drying station includes one or more air knife/knives and one or more tracks. The one or more air knife/knives discharge(s) pressurized air into the passage and the one or more tracks support(s) the conveyor belt. The air knives can be angularly adjustable and can be located above and/or below the passage. The air knives are sized and configured to discharge air into the passage at a volume of at least 10 cubic feet per minute and at a velocity of at least 10 feet per second.

In a preferred embodiment, each of the one or more air knife/knives includes a rotatable duct with a longitudinal axis that extends between the opposing sides of the housing. A slot in the duct is parallel to the longitudinal axis and preferably has a length greater than or equal to one half of the distance between the opposing sides of the housing. The pressurized air is discharged through the slot and the duct is rotated to adjust the direction of the pressurized air. In another preferred embodiment, the passage has a substantially horizontal axis extending between the first and second ends and a first air knife is located above the passage and a second air knife located below the passage. The first air knife discharges air at an angle of between 60 to 85 degrees with respect to the horizontal axis and the second air knife discharges air at an angle of between 30 to 50 degrees with respect to the horizontal axis. The one or more of the air knives can be located above the passage at an adjustable distance from the top wall of the housing and one or more of the air knives can be located below the passage at a fixed distance from the bottom wall of the housing.

The spray barrier(s) is/are located in the interior of the housing and is/are disposed between the washing station and the drying station. The spray barrier(s) prevent the washing heads from directly discharging wash liquid into the drying station. A first spray barrier is substantially planar and extends from the top wall of the housing to a distal edge that defines an upper extent of the passage. The first spray barrier can also include a tray extending along the distal edge, wherein the tray has a first end and a second end. The spray barrier can include a first gap and a second gap that extend between the first and second ends of the tray, respectively, and the side walls. The wash liquid collected in the tray flows into the reservoir via these gaps. In a preferred embodiment, a first spray barrier extends downwardly from the top wall and a second spray barrier extends upwardly from the bottom wall. The second spray barrier is located closer to the first end of the housing than the first spray barrier in order to minimize the amount of wash liquid that enters the drying station.

The conveyor belt is washed in the washing station by the one or more washing heads and dried in the drying station by the one or more air knife/knives as it moves through the passage. Preferably, the washing station has two washing heads and the drying station has four air knives. In a most preferred embodiment, the two washing heads are located above the passage and two air knives are located above the passage and two air knives are located below the passage.

DETAILED DESCRIPTION OF THE INVENTION

The present invention is a washer/dryer for cleaning and drying a moving conveyor belt. The conveyor belt washer/dryer has a housing with an enclosed interior that contains a washing station separated from a drying station by one or more spray barriers that prevent wash liquid from directly discharging into the drying station. A conveyor belt passes through a substantially horizontal passage in the housing, which extends between the first and second ends of the housing. The conveyor belt passes through the washing station at the first end of the passage, where one or more rotatable washing heads are located above and/or below the passage and discharge a wash liquid, such as water and/or detergents, onto the first surface of the belt. Persons skilled in the art will understand that the type of wash liquid used depends on the material that is being carried by the belt and, in food applications, the applicable government codes and regulations. However, the invention is not limited by the type of wash liquid that is used. The splash plate or plates is/are located on the opposite side of the conveyor belt from the washing heads and redirect(s) the wash liquid against the second surface of the belt. The reservoir is located below the splash plate and collects the spent wash liquid.

After the conveyor belt leaves the washing station, it passes into the drying station where one or more angularly adjustable air knife/knives discharge pressurized air into the passage and against the surface(s) of the conveyor belt. One or more tracks support(s) the conveyor belt while it is in the drying station. The tracks are designed to minimize the amount of surface area of the conveyor belt in contact with the tracks in order to maximize the circulation of the air contacting the conveyor belt.

Figure 2:
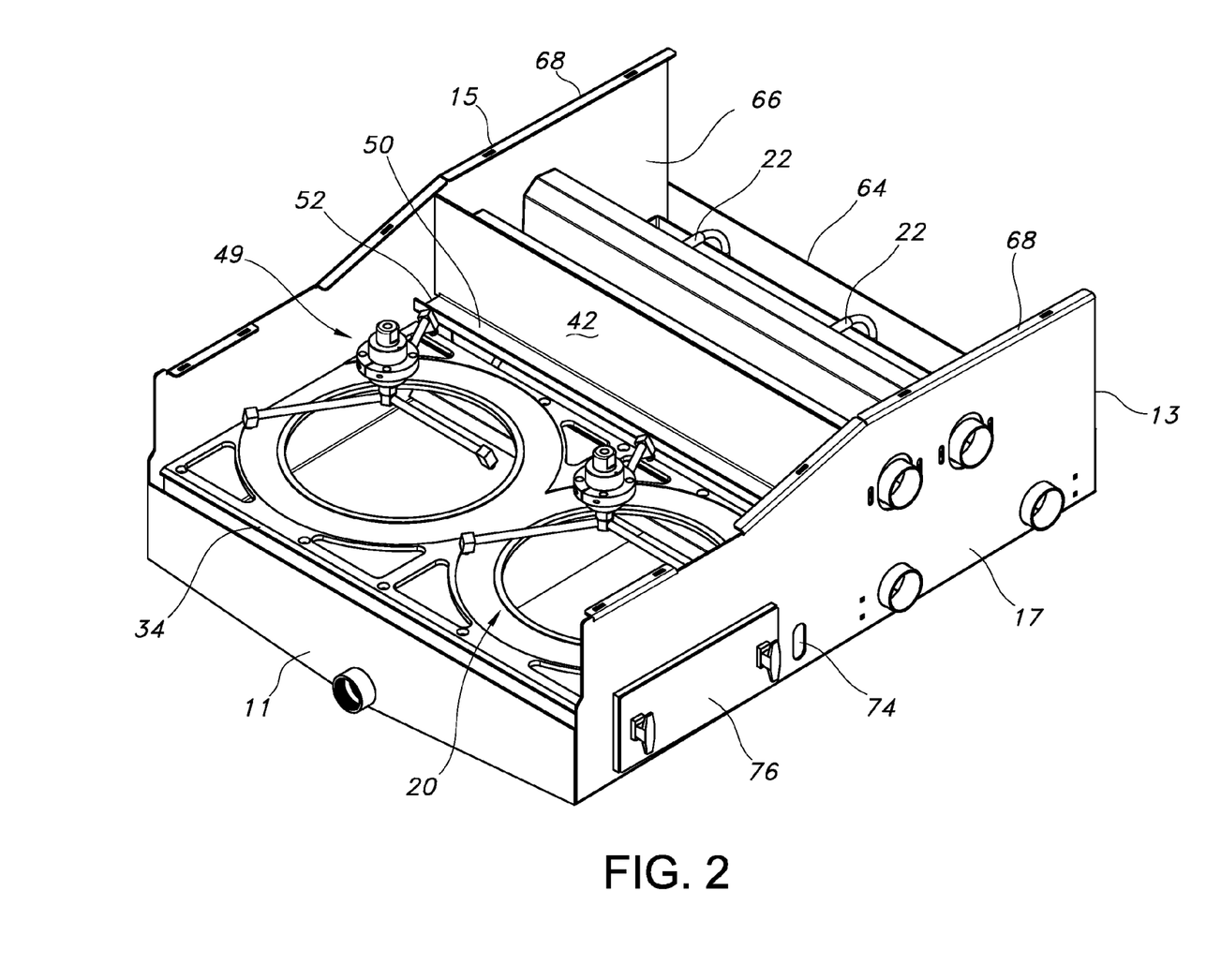
FIG. 2 is a view similar to FIG. 1 with the upper portion of the housing removed.
Figure 3:
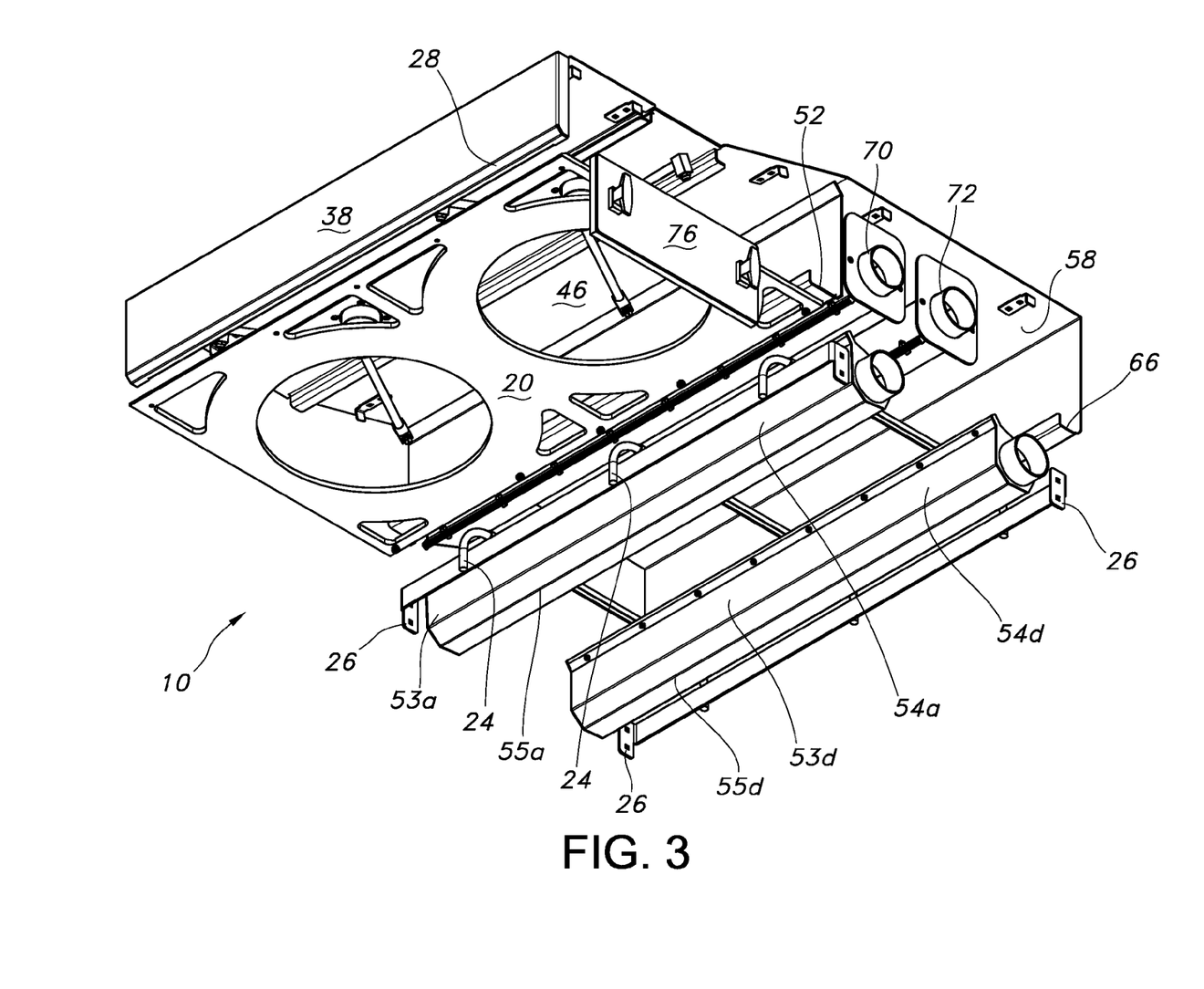
FIG. 3 is a bottom perspective view of the washer/dryer of FIG. 1 with the lower portion of the housing removed.
Figure 4:
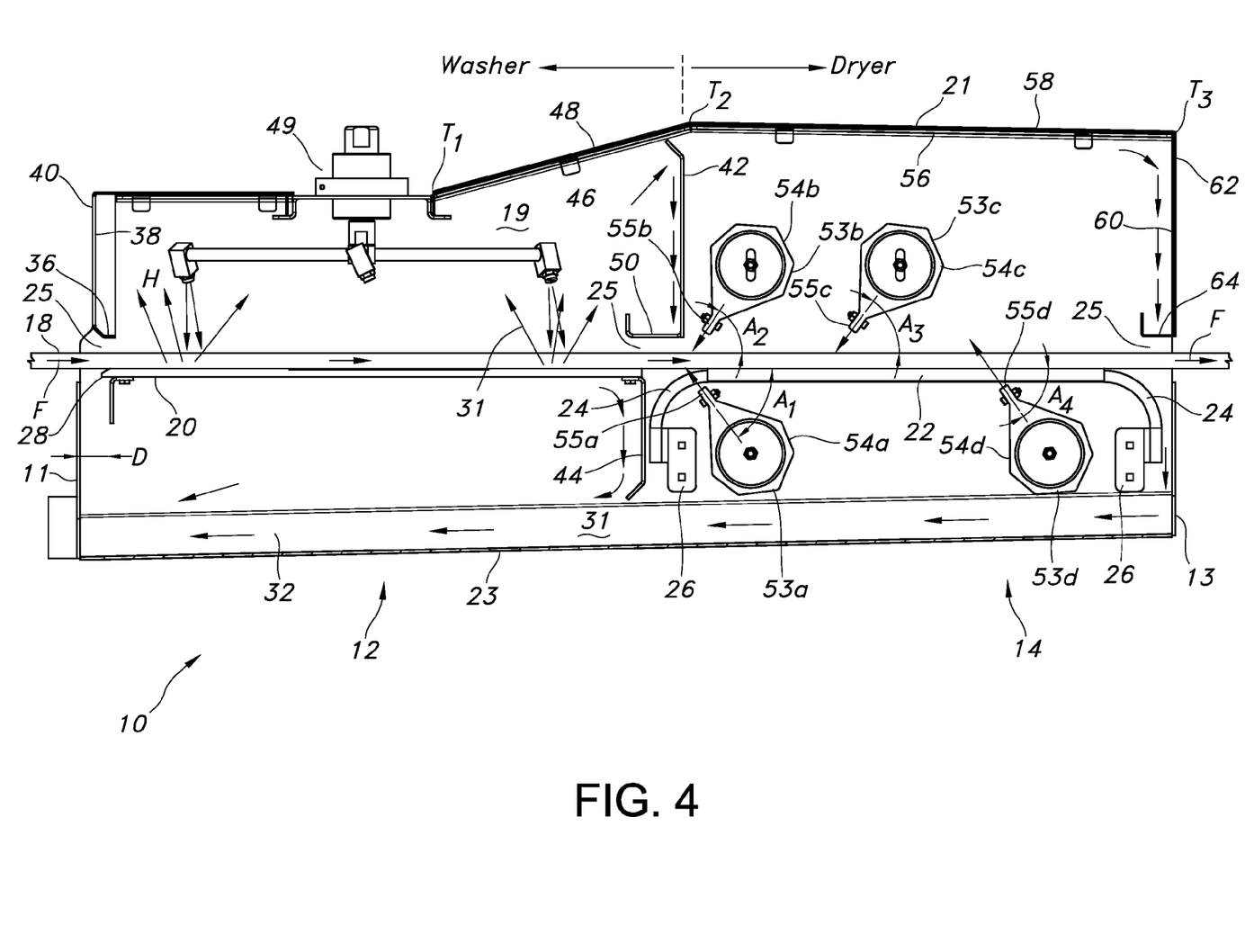
FIG. 4 is a cross-sectional elevation view of the washer/dryer of FIG. 1.

Referring to the drawings, a conveyor belt washing/drying apparatus 10 is shown in FIGS. 1-4. As best seen in FIG. 4, apparatus 10 includes a washing station 12 and a drying station 14. A housing 16 surrounds the stations, and defines a substantially enclosed interior 19. The housing has a first end 11, a second end 13, a pair of opposing sides 15, 17, a top wall 21 and a bottom wall 23. A conveyor belt 18 passes through an opening 30 in the first end 11 of the housing 16 into a passage 25 in the housing 16 in the direction defined by arrows F, whereby the conveyor belt 18 first travels through the washing station 12, before passing through the drying station 14 and out the second end 13 of the housing 16.

A splash plate 20 (as best seen in FIG. 2) is positioned in washing station 12, and is described in detail in U.S. Pat. No. 7,044,287, the disclosure of which is incorporated herein by reference. Belt 18 rides upon and is supported by splash plate 20 within washing station 12. Once the belt 18 travels into the drying station 14, it is then supported by a plurality of tracks 22. In one preferred embodiment, drying station 14 includes three tracks 22 located to support the belt 18 as it travels through the drying station 14. It has been discovered herein that the usage of tracks 22 within the drying station 14 (in contrast to a splash plate or other such structure) maximizes the exposed area of the belt 18 for drying. It has further been discovered herein that the tracks 22 are preferably formed from round metal bars, for example, polished stainless steel. Alternatively, a plastic sleeve or covering can be used in conjunction with a metal bar. The round metal bars may be readily bent and/or configured to fit within the drying station 14. As best seen in FIG. 4, the ends of the bars are preferably bent to form attachment legs 24. The legs 24 cooperate with a plurality of brackets 26 to secure the bars within the drying station 14. It will be appreciated by those skilled in the art that the bars also provide rigidity/stiffness to the apparatus 10.

As best seen in FIG. 4, edge 28 of splash plate 20 is spaced a distance D from belt opening 30 formed in housing 16. In one preferred embodiment, distance D is approximately 1 inch. The gap between edge 28 and belt opening 30 allows excess wash liquid 31 captured between the splash plate 20 and the belt 18 to spill over edge 28 and into reservoir 32. In another preferred embodiment, edge 28 includes a bevel 34 across the width thereof to facilitate/direct the flow of spent wash liquid 31 into reservoir 32.

As also best seen in FIG. 4, washing station 12 includes a drip flange 36 located above belt opening 30 and across the width thereof. During operation, spray (indicated by arrows H) is directed off of splash plate 20 and/or off of belt 18 and towards the interior surface 38 of panel 40. The spray which contacts surface 38 travels down such surface and onto drip flange 36. Thereafter, the spray droplets spill over the edge of drip flange 36, and fall towards edge 28 of splash plate 20. As discussed hereinabove, any droplets/wash liquid 31 located on the upper surface of splash plate 20 spills over edge 28 and falls into reservoir 32.

Apparatus 10 further includes spray barriers 42 and 44 located between washing station 12 and drying station 14. The barriers 42, 44 may be located substantially in line with one another, or as best seen in FIG. 4, spray barrier 42 may preferably be located downstream of spray barrier 44. As shown in FIG. 4, the cross-sectional height of apparatus 10 preferably increases from edge $T_1$ to edge $T_2$. It has been discovered herein that increasing the distance between the top of the belt 18 and the interior surface 46 of panel 48 downstream of washing heads 49 allows for increased capture/retention of the spray.

It has further been discovered herein that the location of spray barrier 42 at a location proximate edge $T_2$, and downstream of spray barrier 44, provides for maximum capture/retention of the spray impacting belt 18. In particular, the location of spray barrier 42 at this location minimizes wash liquid 31 being sprayed directly from the belt 18 into the drying station 14.

The novel design of spray barrier 42 includes a tray 50 which collects the spray being directed against spray barrier 42. Stated differently, the wash liquid 31 bouncing off the belt 18 and/or splash plate contacts spray barrier 42, and thereafter runs down such spray barrier and into tray 50. The wash liquid 31 collected in tray 50 is then directed to a suitable storage/disposal medium. In one preferred embodiment, the wash liquid 31 collected in tray 50 will spill over opposing ends 52 (see FIG. 2) and into reservoir 32. In another embodiment, tray 50 may be angled such that the wash liquid 31 collected therein is directed towards one or both sides of the tray. Of course, it is contemplated herein that other means of removing wash liquid 31 from tray 50 may be utilized, such as drainage tubes, vacuum, etc.

Drying station 14 preferably includes a plurality of air knives 54a, 54b, 54c, 54d, each of the air knives being directed towards conveyor belt 18 at a preselected angle. In one preferred embodiment, drying station 14 includes four air knives 54a, 54b, 54c, 54d, two of the air knives 54b, 54c being located above the conveyor belt 18 and two of the air knives 54a, 54d being located below the conveyor belt 18. The staggered positioning of spray barriers 42 and 44 allows air knife 54a to be positioned at a location below belt 18, and orientated at an angle $A_1$ with respect to belt 18, whereby the fluid is blown off of the conveyor belt 18 and spray is directed back into washing station 12. Air knife 54b is preferably located above belt 18 and proximate spray barrier 42. Air knife 54b is orientated at an angle $A_2$ whereby wash liquid 31/spray located on the surface of the belt 18 is (1) blown back into washing station 12 and/or (2) blown downward into reservoir 32.

Drying station 14 further includes an air knife 54c positioned above the belt 18 and located downstream of air knife 54b. Air knife 54c is orientated at an angle $A_3$ with respect to belt 18. Finally, drying station 14 includes air knife 54d located below the belt 18 and downstream of air knife 54a. Air knife 54d is oriented at an angle $A_4$ with respect to the belt 18.

The wash liquid 31 droplets blown of the belt 18 by air knife 54c are directed downward through the belt openings 30 and into reservoir 32. The wash liquid 31 blown off belt 18 by air knife 54d is directed upwards toward the interior surface 56 of panel 58. Panel 58 is preferably designed such that edge $T_3$ is located closer to conveyor belt 18 then edge $T_2$. In other words, panel 58 slopes towards belt 18 in a direction extending from $T_2$ to $T_3$. The wash liquid 31 blown off of conveyor belt 18 forms a mist of droplets which contact surface 56, and thereafter travel along surface 56 in a direction towards $T_3$. The droplets then travel downward along the interior surface 60 of panel 62, where they are captured within tray 64. The wash liquid 31 collected in tray 64 will spill over opposing ends 66 (see FIG. 2) and into reservoir 32. In another embodiment, tray 64 may be angled such that the wash liquid 31 collected therein is directed towards one or both sides of the tray 64.

As best seen in FIGS. 2 and 3, air knives 54 preferably extend across the entire width of apparatus 10. In one preferred embodiment, air knives 54 provide a high volume of air at high velocity, preferably a volume of at least 10 cubic feet per minute at a velocity of at least 10 feet per second. The combination of velocity and volume blows the excess wash liquid 31 off of the belt 18, forming a mist of droplets. This mist of droplets is thereafter captured in the manners described hereinabove. In one preferred embodiment, the air knife openings have a dimension of 1/32". In another preferred embodiment, the air is unheated, although it will be understood herein that large volumes of air moving at high velocity through an air knife opening of 1/32" will warm due to frictional forces.

In one preferred embodiment, panels 48 and 58 are formed as "quick-removal" panels in the top wall 21 of the housing 16. In this design, the weight of the panels 48, 58 holds such panels 48, 58 in position. No fastening hardware is required—although it is contemplated herein that quick release hardware (e.g. 1/4 turn handles) could be used. The housing 16 may include opposing lips 68 to facilitate locating the panels 48, 58 on the housing 16 and retaining such panels 48, 58 in the proper orientation.

In one preferred embodiment, all four air knives 54a, 54b, 54c, 54d are angularly adjustable. In other words, angles $A_1$ to $A_4$ can be adjusted through a range of angles. It has been discovered herein that the optimum angle is generally dependent upon the design of the belt 18, as well as the speed of travel of the belt 18.

In one embodiment, the angular range for $A_2$ and $A_3$ (i.e., upper air knives 54b, 54c) is approximately 60° to 85°, while the angular range for $A_1$ and $A_4$ (i.e., lower air knives 54a, 54d) is approximately 30° to 50°. The steeper incident angle associated with air knives 54a, 54d has been found to "shear" off the wash liquid 31 adhering to the bottom of the belt 18. In contrast, the upper air knives 54a, 54b, 54c, 54d are preferably adjusted to drive the wash liquid 31 downward through the belt 18 and into the reservoir 32. FIGS. 3 and 4 show a preferred embodiment of the air knives 54a-d that includes an elongated duct 53a-d with a slot 53a-d extending between the opposing sides 15, 17 of the housing 16.

Figure 1:
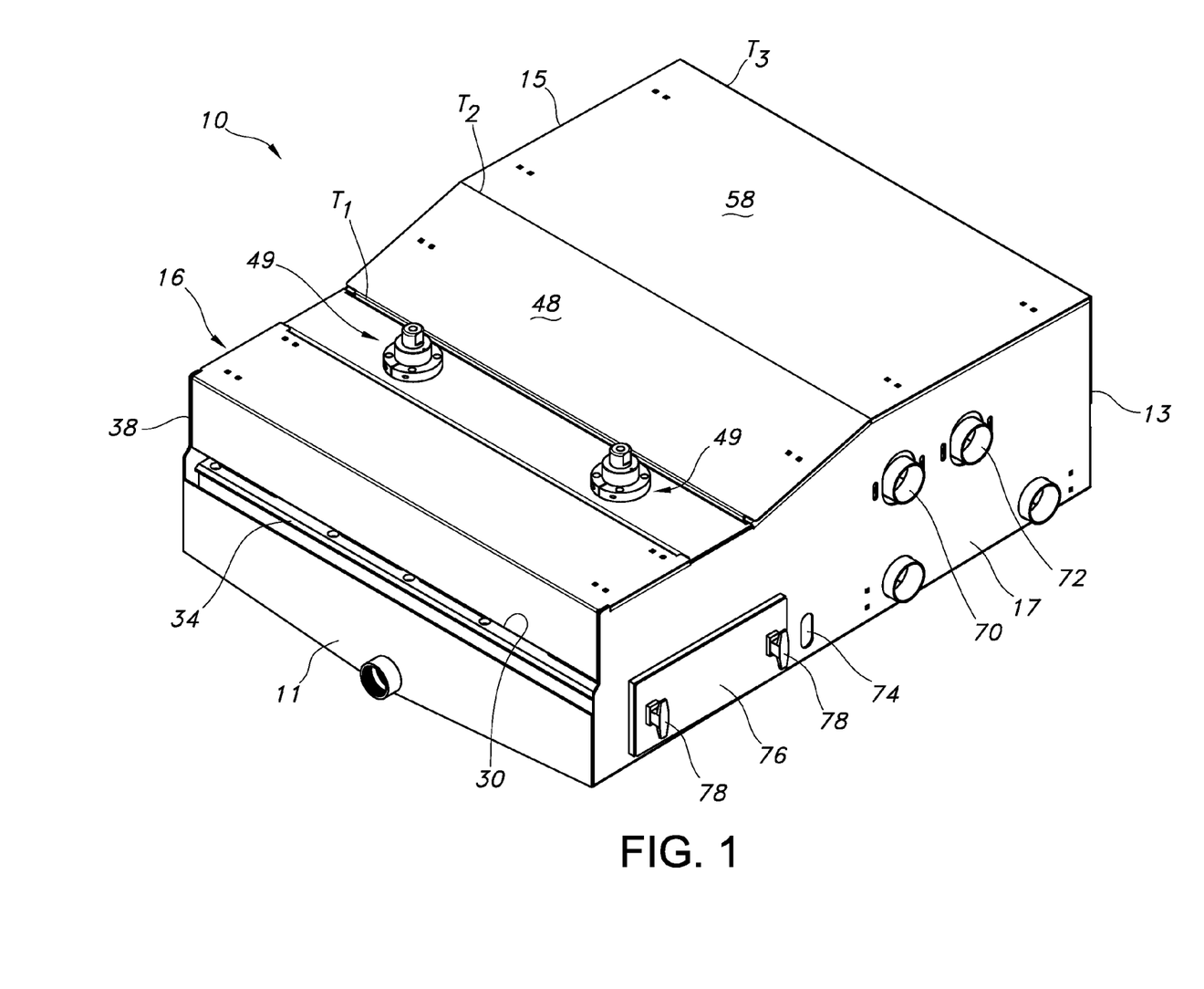
FIG. 1 is a top perspective view of the housing of the washer/dryer of the present invention.

In addition to angular adjustability, the upper air knives 54b and 54c are preferably adjustable in a direction perpendicular to belt 18. As best seen in FIGS. 1-3, housing 16 is formed with a first pair of opposing slots 70 for adjustably supporting air knife 54b and a second pair of opposing slots 72 for adjustably supporting air knife 54c. Each of air knives 54b, 54c is individually adjustable such that the distance between the air knife 54b, 54c and the belt 18 can be adjusted to optimize the drying process based upon the type of belt 18 and the speed of travel of such belt 18. In the embodiment shown in FIGS. 1-4, air knives 54a and 54d are located at a fixed distance from belt 18. Because the lower knives 54a, 54d must be positioned under tracks 22, the lower knives 54a, 54d are already spaced a distance from belt 18. As a result, the lower knives 54a, 54d are preferably located close to the underside of tracks 22 to minimize the distance between the lower air knives 54a, 54d and the belt 18. However, it is contemplated herein that the distance between the lower air knives 54a, 54d and the belt 18 could also be adjustable.

As best seen in FIGS. 1-2, housing 16 is preferably formed with an access slot 74 located on the washing side of the apparatus 10 and underneath the splash plate 20. Access slot 74 is plugged during normal operation, but in circumstances where additional belt cleaning is required (e.g., particular belt designs and/or environments) the plug can be removed to allow insertion of an accessing nozzle spray bar. This access spray bar can supply additional washing fluid to the underneath portion of the belt 18 in desired applications.

As shown in FIGS. 1-3, housing 16 is also preferably provided with an access door 76 which allows access to the area under the splash plate 20 for cleaning. Access door 76 is preferably secured to the housing 16 via a pair of quick-disconnect knobs 78, e.g., 1/4 turn knobs.

It will be appreciated that the present invention has been described herein with reference to certain preferred or exemplary embodiments. The preferred or exemplary embodiments described herein may be modified, changed, added to or deviated from without departing from the intent, spirit and scope of the present invention, and it is intended that all such additions, modifications, amendments and/or deviations be included in the scope of the present invention.

We claim:

1. A conveyor belt washer/dryer for cleaning and drying a moving conveyor belt, the belt having opposing first and second planar surfaces, the conveyor belt washer/dryer comprising:
 a housing defining a substantially enclosed interior and an exterior and comprising first and second ends, opposing sides, a top wall, a bottom wall and a substantially horizontal passage having a first end and a second end corresponding to and extending between the first and second ends of the housing, wherein the passage is sized and configured to allow the conveyor belt to movably pass through the housing;
 a washing station in the interior of the housing and in communication with the exterior via the first end of the passage, the washing station comprising one or more washing heads, a splash plate and a reservoir, wherein the one or more washing heads discharge a wash liquid into the passage in a first direction, wherein the splash plate supports the conveyor belt and redirects the wash liquid in a second direction, and wherein the reservoir collects the wash liquid;
 a drying station in the interior of the housing and in communication with the washing station via the passage and in communication with the exterior via the second end of the passage, the drying station comprising one or more air knife/knives and one or more tracks, wherein the one or more air knife/knives discharge(s) pressurized air into the passage, and wherein the one or more tracks support(s) the conveyor belt; and
 one or more spray barriers in the interior of the housing disposed between the washing station and the drying station, wherein the spray barriers prevent the washing heads from directly discharging wash liquid into the drying station,
 wherein, the conveyor belt is washed in the washing station by the one or more washing heads and dried in the drying station by the one or more air knife/knives as it moves through the passage.

2. The conveyor belt washer/dryer according to claim 1, wherein the splash plate is located below the passage.

3. The conveyor belt washer/dryer according to claim 1, wherein the one or more air knife/knives are located above and/or below the passage.

4. The conveyor belt washer/dryer according to claim 1, wherein the one or more washing head(s) are rotatable.

5. The conveyor belt washer/dryer according to claim 1, wherein the one or more air knife/knives are angularly adjustable.

6. The conveyor belt washer/dryer according to claim 5, wherein the one or more air knives comprise a first air knife located above the passage and a second air knife located below the passage, wherein the passage further comprises a substantially horizontal axis extending between the first and second ends, and wherein the first air knife discharges air at an angle of between 60 to 85 degrees with respect to the horizontal axis and the second air knife discharges air at an angle of between 30 to 50 degrees with respect to the horizontal axis.

7. The conveyor belt washer/dryer according to claim 5, wherein one or more of the air knives is/are located above the passage at a distance from the top wall of the housing, and wherein the distance is adjustable.

8. The conveyor belt washer/dryer according to claim 5, wherein one or more of the air knives is/are located below the passage at a fixed distance from the bottom wall of the housing.

9. The conveyor belt washer/dryer according to claim 1, wherein the top and/or bottom walls of the housing has/have at least one removable panel for accessing the interior.

10. The conveyor belt washer/dryer according to claim 1, wherein each of the one or more air knife/knives comprises a rotatable duct with a longitudinal axis that extends between the opposing sides of the housing and a slot in the duct, wherein the slot is parallel to the longitudinal axis and has a length greater than or equal to one half of the distance between the opposing sides of the housing, wherein the pressurized air is discharged through the slot and the duct is rotated to adjust the direction of the pressurized air.

11. The conveyor belt washer/dryer according to claim 1, wherein a first spray barrier is substantially planar and extends from the top wall of the housing to a distal edge that defines an upper extent of the passage.

12. The conveyor belt washer/dryer according to claim 11, wherein the first spray barrier further comprises a tray extending along the distal edge, the tray having a first end and a second end.

13. The conveyor belt washer/dryer according to claim 12, further comprising a first gap and a second gap, wherein the gaps extend between the first and second ends of the tray, respectively, and the side walls, and wherein the wash liquid collected in the tray flows into the reservoir via the gaps.

14. The conveyor belt washer/dryer according to claim 1, wherein the washing station has two washing heads and the drying station has four air knives, wherein two of the air knives are located above the passage and two of the air knives are located below the passage.

15. The conveyor belt washer/dryer according to claim 1, wherein the one or more spray barriers comprises a first spray barrier and a second spray barrier, wherein the first spray barrier extends downwardly from the top wall and the second spray barrier extends upwardly from the bottom wall, and wherein the second spray barrier is located closer to the first end of the housing than the first spray barrier.

16. The conveyor belt washer/dryer according to claim 1, wherein the top wall above the drying station slopes downwardly towards the second end of the housing.

17. The conveyor belt washer/dryer according to claim 1, wherein the air knives are sized and configured to discharge air into the passage at a volume of at least 10 cubic feet per minute and at a velocity of at least 10 feet per second.

18. The conveyor belt washer/dryer according to claim 1, wherein the housing further comprises an opening and a removable plug in one of the opposing side walls for accessing the washing station and a spray bar, and wherein the removable plug is removed to allow insertion of the spray bar into the interior of the housing.

19. A conveyor belt washer/dryer for cleaning and drying a moving conveyor belt, the belt having opposing first and second planar surfaces, the conveyor belt washer/dryer comprising:
 a housing defining a substantially enclosed interior and an exterior and comprising first and second ends, opposing sides, a top wall, a bottom wall and a substantially horizontal passage having a first end and a second end corresponding to and extending between the first and second ends of the housing, and wherein the passage is sized and configured to allow the conveyor belt to movably pass through the housing;
 a washing station in the interior of the housing and in communication with the exterior via the first end of the passage, the washing station comprising one or more rotatable washing heads, a splash plate and a reservoir, wherein the one or more washing heads are located above and/or below the passage and discharge a wash liquid into the passage in a first direction, wherein the splash plate is located below the passage, supports the conveyor belt and redirects the wash liquid in a second direction, and wherein the reservoir collects the wash liquid;

a drying station in the interior of the housing and in communication with the washing station via the passage and in communication with the exterior via the second end of the passage, the drying station comprising one or more angularly adjustable air knife/knives and one or more tracks, wherein the one or more air knife/knives are located above and/or below the passage and discharge pressurized air into the passage, and wherein the one or more tracks support(s) the conveyor belt; and one or more spray barriers in the interior of the housing disposed between the washing station and the drying station, wherein the spray barriers prevent wash liquid from directly discharging into the drying station, wherein, the conveyor belt is washed in the washing station by the one or more washing heads and dried in the drying station by the one or more air knife/knives as it moves through the passage.

20. The conveyor belt washer/dryer according to claim 19, wherein a first spray barrier is substantially planar and extends from the top wall of the housing to a distal edge that defines an upper extent of the passage, and wherein the first spray barrier further comprises a tray extending along the distal edge, the tray having a first end and a second end.

21. The conveyor belt washer/dryer according to claim 20, further comprising a first gap and a second gap, wherein the gaps extend between the first and second ends of the tray, respectively, and the side walls, and wherein the wash liquid collected in the tray flows into the reservoir via the gaps.

22. The conveyor belt washer/dryer according to claim 19, wherein the top and/or bottom walls of the housing have at least one removable panel for accessing the interior.

23. A conveyor belt washer/dryer for cleaning and drying a moving conveyor belt, the belt having opposing first and second planar surfaces, the conveyor belt washer/dryer comprising:

a housing defining a substantially enclosed interior and an exterior and comprising first and second ends, opposing sides, a top wall, a bottom wall and a substantially horizontal passage having a first end and a second end corresponding to and extending between the first and second ends of the housing, wherein the passage is sized and configured to allow the conveyor belt to movably pass through the housing;

a washing station in the interior of the housing and in communication with the exterior via the first end of the passage, the washing station comprising one or more rotatable washing heads, a splash plate and a reservoir, wherein the one or more washing heads discharge a wash liquid into the passage in a first direction, wherein the splash plate is located below the passage, supports the conveyor belt and redirects the wash liquid in a second direction, and wherein the reservoir collects the wash liquid;

a drying station in the interior of the housing and in communication with the washing station via the passage and in communication with the exterior via the second end of the passage, the drying station comprising one or more air knife/knives and one or more tracks, wherein each of the one or more air knife/knives comprises a rotatable duct with a longitudinal axis that extends between the opposing sides of the housing and a slot in the duct, wherein the slot is parallel to the longitudinal axis, wherein the pressurized air is discharged through the slot and the duct is rotated to adjust the direction of the pressurized air into the passage, and wherein the one or more tracks support(s) the conveyor belt; and one or more spray barriers in the interior of the housing disposed between the washing station and the drying station, wherein the spray barriers prevent the rotatable washing heads from directly discharging wash liquid into the drying station, wherein, the conveyor belt is washed in the washing station by the one or more washing heads and dried in the drying station by the one or more air knife/knives as it moves through the passage.

24. The conveyor belt washer/dryer according to claim 23, wherein the top and/or bottom walls of the housing have at least one removable panel for accessing the interior.

25. The conveyor belt washer/dryer according to claim 23, wherein a first spray barrier is substantially planar and extends from the top wall of the housing to a distal edge that defines an upper extent of the passage, and wherein the first spray barrier further comprises a tray extending along the distal edge, the tray having a first end and a second end.

26. The conveyor belt washer/dryer according to claim 25, further comprising a first gap and a second gap, wherein the gaps extend between the first and second ends of the tray, respectively, and the side walls, and wherein the wash liquid collected in the tray flows into the reservoir via the gaps.

* * * * *